June 24, 1958 H. K. WONG 2,840,200
STRUCTURAL CONNECTOR
Filed June 30, 1955 2 Sheets-Sheet 1

INVENTOR.
HERBERT K. WONG
BY
*Lippincott & Smith*
ATTORNEYS

June 24, 1958 H. K. WONG 2,840,200
STRUCTURAL CONNECTOR
Filed June 30, 1955 2 Sheets-Sheet 2
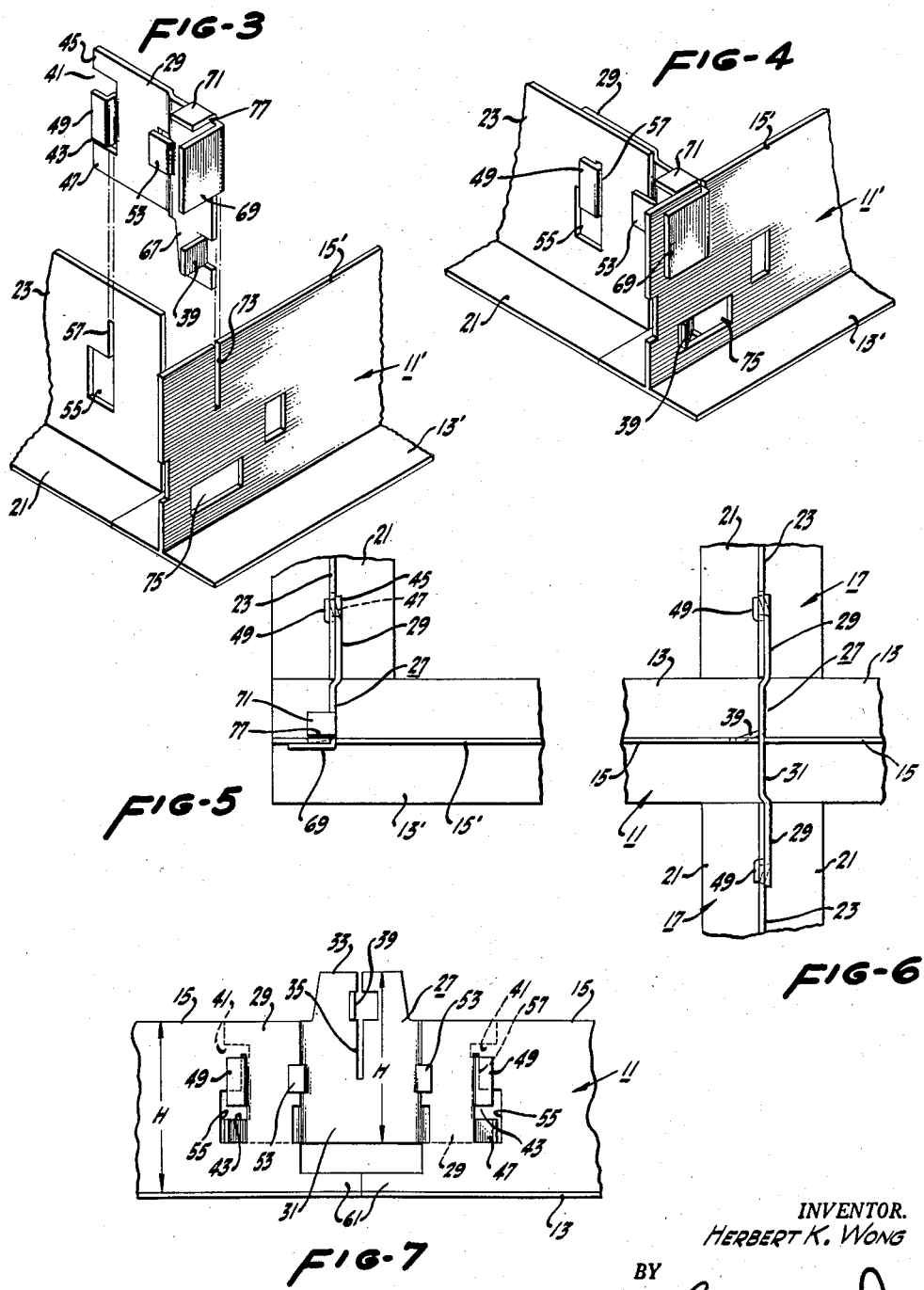
INVENTOR.
HERBERT K. WONG
BY
ATTORNEYS United States Patent Office 2,840,200
Patented June 24, 1958

2,840,200
STRUCTURAL CONNECTOR

Herbert K. Wong, San Francisco, Calif., assignor to Cepco, Inc., San Francisco, Calif., a corporation of California Application June 30, 1955, Serial No. 519,061

1 Claim. (Cl. 189—35)

This invention relates to structural connectors for connecting together small T- beams, L-beams and the like. In particular, the invention relates to an improved connector for use in assembling a rectangular network of light-weight T-beams used to support modular acoustic or translucent ceiling panels.

In such light-weight construction, riveting or welding of the beams is unnecessary and undesirable. Instead, small clips or connectors that can be installed quickly and simply are used to fasten the beams together. The rectangular network of beams consists of long beams, called stringers, that commonly run the entire length or width of a room, and short cross-beams extending between and perpendicular to the stringers. For economy and convenience, the beams used for stringers are usually manufactured and shipped in sections of some standard length—eight feet long, for example. When longer stringers are required, two or more of these sections must be fastened together end-to-end. The connectors herein described may be used for this purpose. Furthermore, the cross-beams must be fastened to the stringers. The connector herein described may be used for this purpose also.

In accordance with the foregoing it is an object of this invention to provide a connector for securing a sequence of frame stringers or to connect cross-members to a sequence of frame stringers in such fashion that the assembly may be readily assembled and disassembled and at the same time, if desired, locked in the assembled position easily to be disassembled by a change in location of the locking medium.

Another object of the invention is to provide a connector adaptable for connecting at either side of connected members, such as stringers, and still maintain precise alinement of the web sections, it being apparent that for some uses it is easier to establish the connection on one side of the web than the other and yet it is essential that none of the web sections shall be offset relative to each other.

A further object of the invention is that of providing a connector usable either for connecting a plurality of flanged sections together in concatenated fashion or to provide for connecting certain members to abut a stringer member and to be connected between adjacent stringers as cross members.

Other objects of the invention are those of providing a connector for purposes such as herein outlined and to form the connector readily by stamping, punching or extruding or in any other desired fashion from a single piece of metal or other suitable component so that the connector may be formed in an inexpensive manner and yet may be highly efficient in its use.

Other objects and advantages of the invention will become apparent from a consideration of the following description and claim read in the light of the accompanying drawings in which, Fig. 1 is a generally isometric view intended to illustrate in principle the manner of connecting a plurality of stringers and cross-members for positioning thereon of a mulitiplicity of light transmitting modular units, the view being in the direction looking from beneath the assembled elements;

Fig. 2 is also an isometric view showing, in part, a connector assembled relative to a stringer member for joining thereto a pair of cross-members and in part, in exploded fashion, the manner in which the connector is assembled with respect to the stringers to provide for joining the cross-members thereto, this view also showing by the exploded portion the connector, in isometric projection, separate from the stringer and cross-members;

Fig. 3 is also an isometric view of the connector as particularly adapted for forming a connection between two flanged sections terminating in a right angle, the view being exploded insofar as the separation of the stringer, the associated cross-member and connector are concerned;

Fig. 4 likewise is an isometric view of the connection provided by Fig. 3 with the connector, stringer and cross-member all shown in assembled fashion relative to each other;

Fig. 5 is a plan view of the assembled construction of Fig. 4 looking down upon the assembly;

Fig. 6 is a plan view looking down upon an assembled connection of a pair of cross-members and a stringer joined by the connector as shown particularly by the right hand portion of Fig. 2; and Fig. 7 is an elevational view to show the manner of joining a pair of stringer elements in concatenated array.

Figures 1, 2:
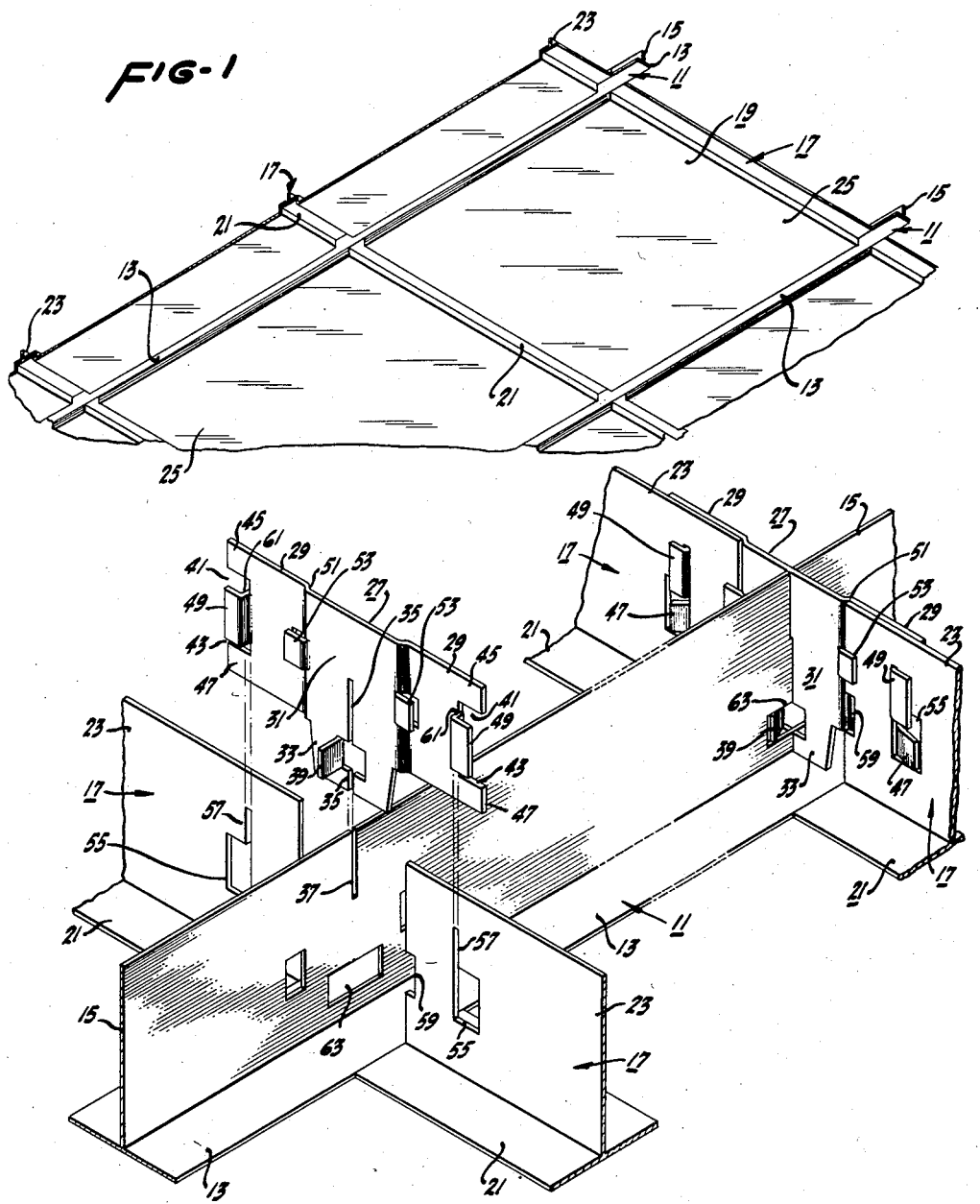

Referring now to the drawings for a further understanding of the invention, Fig. 1 represents, looking upwardly in isometric view, a series of T-shaped stringers 11 each having a flange 13 and a web 15 adapted to be hung or otherwise suspended beneath a ceiling and behind which suitable illuminating sources (not shown) are arranged. The unit may be suspended by hooks, strips, cords, links or in any other desired fashion, none of which, per se, constitutes part of this invention. Joined to the stringers 11 are a plurality of cross-members, generally represented at 17. The cross-members extend between adjacent parallelly arranged stringers 11 suitably to space them and at the same time, as illustrated, to provide reticulated areas conveniently represented in Fig. 1 at 19. Like the stringers the cross-members 17 also are provided with flange members 21 and web sections 23 constituting T-shaped supports. As can be seen from Fig. 1 the stringers 11 provide by their flanges 13 extending at either side of the web for a T-shaped stringer, together with the flanges 21 of the cross member 17, a rectangular area in which modular units 25 may be supported. It is already known in the art and has been disclosed heretofore by this applicant that modular units of plastic variety serving to transmit light may be hung and supported with the unit edges resting upon the flanges of the stringers and cross-members so that further discussion of this sort need not now be entered into, it being understood, of course, that the stringer and cross-member units also may serve to support other types of components, such as sound treated ceiling units of various forms and types.

In this invention the arrangement to be provided is particularly concerned with the connector 27 shown particularly in elevation and separated from other components by the exploded form of Fig. 2, as well as in assembled fashion relative to the other components. This connector, as can be appreciated, is arranged to connect cross-members to the stringer and, as can be seen particularly by Fig. 7, precisely the same form of connector may be used to connect concatenated stringer sections.

Referring first, however, to Fig. 2 the connector element 27 will be seen to comprise a planar retaining plate 29 having its outer ends coplanar and its central section 31 bowed or offset slightly outwardly. In the particular form illustrated the bowing will be seen to be approximately the width of the web of the element to which the connector is attached. The bowed central section 31 has an extension 33 projecting outwardly thereof. As can be observed, particularly by the showing in Fig. 2 where the connector is assembled with the T-shaped stringer 11 and the T-shaped cross-member 17 the combined width of the bowed central section 31 and its extension 33 corresponds to the depth of the web 15 in the preferred form. This likewise has been indicated by Fig. 7. It is a preferred feature of the invention in that it adapts the unit particularly to pre-punched stringers and cross-members to which it is to be fastened and makes possible the ready assembly of these components either with the connector arranged to fasten a group of elements in a sequence or to connect them as abutting sections to form a reticulated series.

The connector 27 has a slot 35 extending inwardly from the extension 33 into the bowed central section 31. The slot length is not critical but in the formation and in using the component to connect cross-members with a stringer as shown by Fig. 2 the slot length 35 should correspond to the length of the web 15 of the stringer which extends beyond the slot 37 cut into the stringer in the direction of the flange so that the outermost portion of the extension 33 rests against the flange 13 of the stringer when the connector is assembled therewith as shown particularly at the right hand portion of Fig. 2. There extends outwardly from the extension 33 on the bowed section 31 a tab 39 which conveniently may be formed by recessing the extension to one side of the slot and leaving the tab 39 to be bent outwardly prior to completing the cutting or punching of the slot 35. This tab, it will be explained later, is adapted to connect into the web of the stringer to secure the component and movement and effectively to lock the members together.

The planar retaining plate 29 has at either end thereof a pair of parallel slots 41 and 43 spaced apart at any desired distance and extending inwardly from the ends to leave at either side thereof outwardly extending tabs 45 at one side of the retaining plate and 47 at the other side of the plate nearest the extension 33. The portion of the retaining plate 29 remaining between the slots 41 and 43 is bent into a Z-shaped section or offset tongue 49 which, when assembled with either a cross-member or a stringer, will serve to position and locate the connector with respect thereto. It will be observed, and particularly from the exploded view portion of Fig. 2, that the Z-shaped section, if extended out flat to a plane parallel to the planar retaining plate 29, would extend beyond the end of the tabs formed as 45 and 47. Provision is made in the initial stamping, punching or otherwise forming of the connecting element for this length in order to provide the Z-shaped section 49 of such length that its outermost portion terminates generally at the plane of the ends of the tabs 45 and 47. At the bend 51 of the connector, where the bowed section extends outwardly from the plane of the end section, and preferably about midway of the width thereof, a second tab 53 is formed. This tab serves, in the assembled use, to locate the connector component with respect to the web of the section after initial punching with respect thereto in the manner particularly depicted by the right hand portion of Fig. 2.

Considering now the manner of securing the connector to a stringer member, for instance, to locate two cross-members with respect thereto in the fashion shown by Fig. 2 the stringer is slotted at 37, as already explained. The web sections 23 of the cross-member 17 have punched or otherwise formed therein apertures 55 preferably of rectangular shape and into which the Z-shaped tabs 49 are adapted to fit. The apertures 55 have slots 57 extending outwardly from one edge (that is, the edge closest to the position of attachment of the connector and closest to the next adjacent webbing) which form the aperture into one having an L-shaped extension. The end of the cross-member which is to be placed adjacent to the stringers also has a notch 59 cut therein and around which notch the tab 53 is adapted to fit.

For convenience of illustration in the showing of Fig. 2 the cross-members 17 at the left hand part of the figure are shown in their finally assembled position relative to the stringer 11. However, in the assembly of the components it is to be understood that the connector 27 is first placed to straddle the web of the stringer and positioned so that the portions of the extension in the bowed section separated by the slot 35 straddle the stringer web and the component fits about the web of the stringer and is located by the slot 37. Under these circumstances the outermost edge of the extension 33 rests upon the flange 13 of the stringer member which is the position in which the connector is shown in the right hand half of Fig. 2. At this stage of the assembly, and first considering one cross-member, for instance, the cross-member is positioned relative to the extending tabs 45 and 47 of the connector in such fashion that the large rectangular aperture 55 is caused to overlap the Z-shaped section 49 and the tab 53 is located opposite the notch 59. In this arrangement the cross-member and connector are shifted laterally of each other until the Z-shaped section 49 is extended through the aperture 55 and the surface of the tab 53 overlaps the edge of the web. So positioned, if now the cross-member is pushed downwardly so that its flange section 21 is brought to a coplanar position with respect to the flange 13 it will be observed that the upright section 61 of the Z-shaped tab which is made of a height approximately the thickness of the web 23 will pass into the L-shaped slot 57 and locate the tabs 45 and 47 on one side of the web and the outer portion of the Z-shaped section 39 on the other side of the web. At the same time the planar retaining plate 29 will be located on the same side as the web 17 as the tabs 45 and 47, while the tab 53, due to the bend provided by bowing the central section 31, will permit this tab to be located in the opposite side of the flange and surround the edge above (that is, in the direction away from the flange) the notch 59.

Under these circumstances it becomes evident that the lower tabs 47 are now arranged opposite the lower portion of the rectangular aperture 55. In this relative position of the connector and cross-member it is possible for fastening purposes to bend the tab 47 so that it is extended directly through the adjacent aperture. This arrangement thus prevents relative displacement between the cross-member and the stringer. At the same time it will now be appreciated that if the stringer is apertured, as shown at 63, the positioning of the connector to straddle the web of the stringer, will bring the tab 39 adjacent to the aperture 63 in which case, as shown to the right of Fig. 2, bending the tab 39 inwardly causes it to extend through the web aperture to overlap the web of the stringer and thereby locate it also in fixed position.

In the foregoing manner it becomes apparent that the connector may serve to connect cross-members on either side of a stringer, the connection of the cross-member to the left of the stringer being precisely like that explained in connection with the explanation above given. Likewise, it is apparent that the relative positioning of the connector may be either to the right or to the left and obviously a reversing through 180° of the position of the connector 27 will not in any way change the type of connection except that under these circumstances the cross-member will be on the far side of the retaining plate rather than on the near side, as shown.

Now considering particularly Fig. 7, the connection there shown is adapted particularly for fastening two adjacent stringer members in alinement or concatenated fashion. Under these circumstances the stringers are preferably punched in slightly different fashion than for the attachment of cross-members. As can be seen by the illustrated example the apertures 55 having the slots 57 extending outwardly therefrom to form the L-shaped opening and the notches such as shown at 59 are still retained. However, in this instance the stringer has extending outwardly for a short distance a portion of the web, shown particularly at 65, so that these web sections can then be brought into abutment. For the establishment of a connection of the sort indicated by Fig. 7 the connector 27 is reversed in its position from that shown by Fig. 2 so that the extension 33 extends outwardly rather than inwardly toward the flange. By placing the connector adjacent to the web of the separate stringer sections with the Z-shaped portion 49 located to extend through the rectangular aperture 55 and the tab 53 arranged in the notch 59 the adjacent positioning of the two stringers is established and the connection is made by way of the connector when the connector is moved upwardly or away from the web to a position such as that shown by Fig. 7 where the Z-shaped section overlaps the web, as does the tab 53, and the connector retaining plates 29 are on the opposite side of the web. Under these circumstances, and as was made apparent in the discussion with respect to securing cross-members by the connector, the lowermost tab extensions 47 then project through the lower portion of the aperture 55 and by being bent slightly inwardly to project to the same side of the web as that at which the Z-shaped element 49 is located it will be appreciated that the component may be locked from movement in a direction normal to the plane of the flange in that the upright section 61 of the Z-shaped member 49 is at the uppermost end of the slot 57, which limits the outward motion of the connector, and the projected tab 47 pushed through the lower edge of the rectangular edge of the tab 55 limits the inward motion. Therefore, the connector establishes a rigid connection between successive stringer sections.

As a further feature of the invention it will be apparent that by providing the connector with its central section 31 bowed as indicated particularly by Fig. 2 the connector may be placed at either side of the web of the stringer and still maintain the webs of adjacent stringers in precise alinement. It is particularly important in order that there may be a uniform and regular pattern and that the centers of the webs of the stringers shall not vary from a fixed center line that this type of connection be made. With the connector of the character shown the assembly of the components is more readily achieved and regardless of which side of the webbing the connector is located the precise centering of all web sections is achieved and it is impossible for any stringers or cross-members to become offset with respect to those adjacent.

The centering of the web sections of the cross-members is illustrated also by the connection shown, for instance, in the plan view of Fig. 6. In this connection the stringers are not shown as connected together whereas there are two cross-members abutting the stringer. It, however, will be appreciated that this view illustratively represents the conditions which obtain insofar as centering the web section is concerned with respect to each form of connection.

Referring now to Fig. 3 a slight modification of the connector has been shown. In this respect it will be observed from the use of like reference numerals which, in some instances for ready identification, are the primes of the numbers, that one portion of the connector for providing connections between stringer and cross-members under circumstances where each member terminates in a position such that the stringer and cross-member together form a right angle bend as, for instance, in a corner of the ceiling for which condition the connector is modified from the form shown by Figs. 2, 6 and 7 particularly in that the lowermost portion terminates at substantially the termination of one edge of the bowed section and the terminated part is so arranged that one-half of the extended portion 33 is removed and the slot 35 likewise is omitted. In this form of the connector the Z-shaped section 49 is retained and the bowed section comprises only half of the extension 31, which half is now identified in Fig. 3 by the numeral 67. The portion of the bowed section 69 of Fig. 3 corresponds, it will be seen, to the lowermost section of the connector shown by Figs. 2 and 7 in particular and, in addition, for a connection of this sort there is added at the upper edge of the bowed section a tab 71 which is adapted to fit over the inner edge of the web of one of the sections to be joined. The web of one section is provided with an additional slot 73 through which the bent portion 69 of the bowed section of the connector is passed. It will be seen under these circumstances that in the assembly of the components the connector of Fig. 3 is first positioned so that the extended portion 69 passes into the slot 73 of the web section 15' of the stringer 11' and the outwardly extending tab 39 will then be positioned adjacent to the aperture or slot 75. The connector may then be locked in place, as is shown particularly by Fig. 4, by bending the tab 39 forward from its normal position and, as shown by Fig. 4, until it passes through the aperture or slot 75, in which case the connector has its outward projection 67 rested against the flange of the stringer or cross-member, as the case may be. The inward position is also fixed by the portion 69 of the bowed section contacting the base of the slot 73 and its removal outwardly from the element is prevented by the tab 39 projecting through the aperture or slot 75. At this time the connection of the cross-member or stringer which is to be positioned at right angles to the web 15' may be made and, as already explained, this connection is provided initially by resting the Z-shaped section 49 relative to the connector through a slotted section 55 in the web, which section has an outwardly projecting slot 57 forming it into an L. Then, by forcing the section downwardly so that the upper portion of the slot 57 rests against the upper shoulder of the Z-shaped section 49 and the tab 53 slides over the web the two components are locked together. In this connection it will be appreciated that the tab 71 actually forms no specific part in the fastening except that its inner shoulder 77 which is separated from the tab by approximately the thickness of the webbing holds the two components in generally fixed position so that they cannot be moved about the webbing as a general pivot point.

It will, of course, be apparent that other modifications of the invention are also possible within the concept of the herein explained teachings although the forms specifically illustrated have been shown as particularly indicative of the general nature of fastening possibilities.

Having now described the invention, what is claimed is:

A structural connector consisting of a single metal plate having two coplanar end portions, a central portion offset from said end portions to form two transverse shoulders between the central portion and the two end portions, said plate having a substantially straight upper edge extending across said central and end portions, said central portion being of greater width than said end portions so that the lower edge of the central portion is not in alinement with the lower edge of said end portions, each end of said plate having two slots extending inward lengthwise to form three tongues, the center one of said three tongues at each end of the connector being offset from the plane of said end portions in the same direction and by twice the amount that said central portion is offset, the two outer ones of said three tongues at each end of the connector being coplanar with said end portions, two tabs cut out of and offset from respective ones of said end portions and extending outward lengthwise of the connector from said shoulders, said tabs being coplanar with said offset tongues, a transverse slot extending inward from the lower edge of said central portion, and a rectangular tab cut out of and bent substantially perpendicular to said central portion leaving a rectangular aperture therein, the plane of said last-mentioned tab being transverse to the connector, said transverse slot extending through said aperture.

References Cited in the file of this patent

UNITED STATES PATENTS

| | | |
|---|---|---|
| 2,598,152 | Wright et al. | May 27, 1952 |
| 2,710,679 | Bibb et al. | June 14, 1955 |